March 20, 1956 C. M. PERKINS 2,738,690
MEANS LIMITING ENERGIZATION OF TRANSMISSION SHIFTING APPARATUS
Filed Oct. 2, 1953 4 Sheets-Sheet 1 fig. 1

INVENTOR.
CHARLES M. PERKINS
BY
ATTORNEY fig. 7 fig. 2 fig. 8

March 20, 1956  C. M. PERKINS  2,738,690
MEANS LIMITING ENERGIZATION OF TRANSMISSION SHIFTING APPARATUS
Filed Oct. 2, 1953  4 Sheets-Sheet 3 fig.3

Inventor
CHARLES M. PERKINS
Attorney

United States Patent Office 2,738,690
Patented Mar. 20, 1956

2,738,690

MEANS LIMITING ENERGIZATION OF TRANSMISSION SHIFTING APPARATUS

Charles M. Perkins, Kalamazoo, Mich., assignor to Fuller Manufacturing Company, a corporation of Delaware Application October 2, 1953, Serial No. 383,866

8 Claims. (Cl. 74—745)

This application relates to transmission shifting control means and it particularly relates to means associated with the usual valve or switch shifting solenoids for preventing energization of said solenoids beyond the normal operating requirements.

In a variety of automatic transmission shifting devices, such as the devices illustrated and described in my application Serial No. 236,817 now Patent No. 2,654,268 or in the application of Ludvigsen and Backus, Serial No. 133,404 now Patent No. 2,637,221, there is provided one or more solenoids for effecting a mechanical operation incident to shifting a shiftable gear group, said solenoids operating upon the occurrence of a predetermined event in the gear shifting sequence. For example, in the particular apparatus disclosed and described in the above mentioned application Serial No. 236,817, a solenoid is provided for operating a valve by which a pressure fluid is caused to actuate a power cylinder which in turn effects the shifting of an auxiliary gear set upon a predetermined movement of a main gear set with respect to its neutral position. In the specific embodiments disclosed in Serial No. 205,751 now Patent No. 2,637,222 and Serial No. 236,817 at least two electric switches are connected in series with a solenoid and a source of power, one of which switches is manually operated to determine the direction of action of said solenoid and the other of which switches is so connected to a part of said main transmission which moves upon a shifting thereof, such as the interlock, so that said switch will close as said main transmission moves toward, or moves into, its neutral position.

In normal operation of this apparatus, the circuit thus briefly mentioned, and illustrated and described in more detail in said above named application Serial No. 236,817, is entirely satisfactory. However, it has been observed that certain conditions of operation are sometimes encountered for which the circuit there appearing is not wholly adequate and constant improvement is always desirable. For example, a truck is sometimes left with its engine running for extended periods of time, such as when being loaded or unloaded. With the truck electric system thus energized and the main gear set in its neutral position, one of the solenoid windings, as determined by the manually operated selector switch, will be continuously energized. While this solenoid winding will be of ample ruggedness to meet all ordinary operating conditions, if it is continuously energized for a period of time measured in hours, it often happens that the solenoid is excessively heated and it may be irreparably injured.

Further, where the electrical circuit is continuously connected to a source of energy excepting for a switch which is closed and then opened each time the main gear set enters and then leaves neutral position, the arcing wear on the switch contacts may soon require replacement of the switch.

Accordingly, a major object of the invention is to provide a circuit for controlling the energization of a gear shifting solenoid which is so connected that it is normally automatically energized by the attainment in a gear set of a predetermined position, such that if said gear set is left in such position for a period of time substantially exceeding the period of time contemplated for ordinary operation of the apparatus, said solenoid will be preserved from damage.

A further object of the invention is to provide circuit means, as aforesaid, which will automatically de-energize said solenoid upon completion of its function in a given shifting operation.

A further object of the invention is to provide a circuit wherein the solenoid winding will be energized only long enough to perform its function and then will be immediately de-energized regardless of whether the vehicle's main transmission remains in neutral or is moved into another shifted position.

A further object of the invention is to provide a circuit, as aforesaid, which will reduce the arcing wear on the contacts of that switch which responds to the position of the main gear set.

A further object of the invention is to provide a circuit, as aforesaid, which will be compatible with existing circuits for controlling gear shifting mechanisms, as aforesaid, and which can be added thereto without material change therein.

A further object of the invention is to provide a shifting control circuit which will permit the use of a substantially smaller solenoid coil than is otherwise normally used and thereby secure substantial savings in both the cost of the parts and in the space required for accommodating them.

A further object of the invention is to provide circuit means, as aforesaid, which will be relatively simple and inexpensive to incorporate into existing shift controlling circuits.

A further object of the invention is to provide circuit means, as aforesaid, which will be rugged and reliable.

A further object of the invention is to provide circuit means, as aforesaid, which will not detract from the ease or accuracy of normal operation of the truck.

Other objects of the invention will be apparent to persons acquainted with equipment of this general type upon reading of the following specification and inspection of the accompanying drawings.

In general

The construction in general comprises fluid, as air, energized actuating means for effecting a shift of an auxiliary gear group, and electrical means operated by means responsive to movement of the shift lever, or parts mechanically connected therewith such as the interlock mechanism of the main transmission, for controlling said fluid energized actuating means.

More specifically, the fluid energized actuating portion of the device includes a shift fork connected to the auxiliary gear group, a fluid pressure cylinder for actuating the shift fork, a source of fluid under pressure and a valve, responsive to a pair of solenoids, for controlling the flow of said fluid from the source to one end, or the other, of the cylinder.

The electrical control portion of the device comprises a series circuit having a pair of branches, each branch having a solenoid for moving said valve into one and the other of its operating positions, a manually controlled selector switch for selecting which of said branches is connected to the remainder of said circuit, a source of constant potential and a control switch actuated by the interlock mechanism of the main transmission, or other mechanism movable with the shift lever, for energizing or de-energizing the selected one of said solenoids.

Said control switch is normally closed and is so held by a yieldable means, as a spring, and is opened, overpowering said spring, by movement of said interlock mechanism as the gears associated therewith are moved out of neutral position. Whenever the main gear group is in a shifted position the control switch is held open by means actuated by said interlock mechanism, and as soon as the main gear group returns to neutral position said control switch is permitted to close. When the control switch closes, one solenoid or the other is energized, depending upon the position of the selector switch. Thus energized, the solenoid will either move the valve into its other position, or hold it in its present position. Thus, said valve, if held in the same position, will continue to direct fluid under pressure into the cylinder in the same direction as previously and the shift fork of the auxiliary transmission, connected for operation to said cylinder, will not move. If the solenoid core moves, it shifts the valve into its other position whereby the pressure fluid will be directed into the opposite end of the cylinder and the shift fork will be actuated to effect a shift of the auxiliary gear group.

Thus, so long as the selector switch is not moved, the main gear group can move into and out of its neutral position freely without effecting a shift of the auxiliary gear group. However, when the selector switch is moved, it will effect such preselection of the control mechanism that, upon the next entry of the main gear group into neutral position, a shift in the auxiliary gear group will be brought about.

In this structure my invention contemplates introducing into the circuit energizing the solenoid, devices by which said solenoid may be energized in the usual manner but will de-energized said solenoid as soon as it has completed the function of shifting said valve. In one preferred embodiment, herein used for illustrative purposes, pressure responsive switches are introduced into the fluid pressure lines between said valve and the respective ends of the power cylinder and so connected into the electric circuit that shifting of the valve and the changing of fluid pressure in a selected line as a result thereof will actuate the pressure responsive switch associated with said line and thereby de-energize the solenoid.

*Detailed description*

While the principle of the invention may be practiced in a wide variety of situations and with a wide number of specific means, it will be convenient to illustrate same by reference to the apparatus shown and described in detail in United States application Serial No. 236,817. Inasmuch as the full details of such gear sets and accompanying gear set mechanism may be readily ascertained by reference to said application, the following description will set forth only sufficient of such apparatus to facilitate the understanding of the present invention.

In the specific embodiment of the invention herein disclosed, there is provided a main transmission or box 10, containing a main gear group, which is associated at one end with an auxiliary transmission or box 11, containing an auxiliary gear group in series connection with the main gear group. The other end of the main box 10 is associated with an input shaft 15 connectible with the clutch of a vehicle (not shown). An output shaft 54 extends from the auxiliary box 11 for connection to a propeller shaft 90 in a conventional manner. Said gear groups are here shown in two separate, connected housings for convenience in reference but they may both be enclosed in a single housing if desired without going outside the scope of this invention. The auxiliary gear group is provided with synchronizers 79 and 80, preferably of the friction clutch type.

Since the present invention is not concerned with the details of either the main gear group or the auxiliary gear group, but rather with the association and co-action of said gear groups with each other and with the control means herein disclosed, the following description of said gear groups is given by way of example only, and is not intended to limit the scope of the invention.

*The main box*

The main box or main gear group may in general be any device comprising an assemblage of gears capable of being shifted to effect two or more different power ratios wherein there exists a main shaft carrying thereon one or more gears normally rotatable with respect thereto but arranged for selective positive clutching to said main shaft to effect ratio changes.

Figure 3:
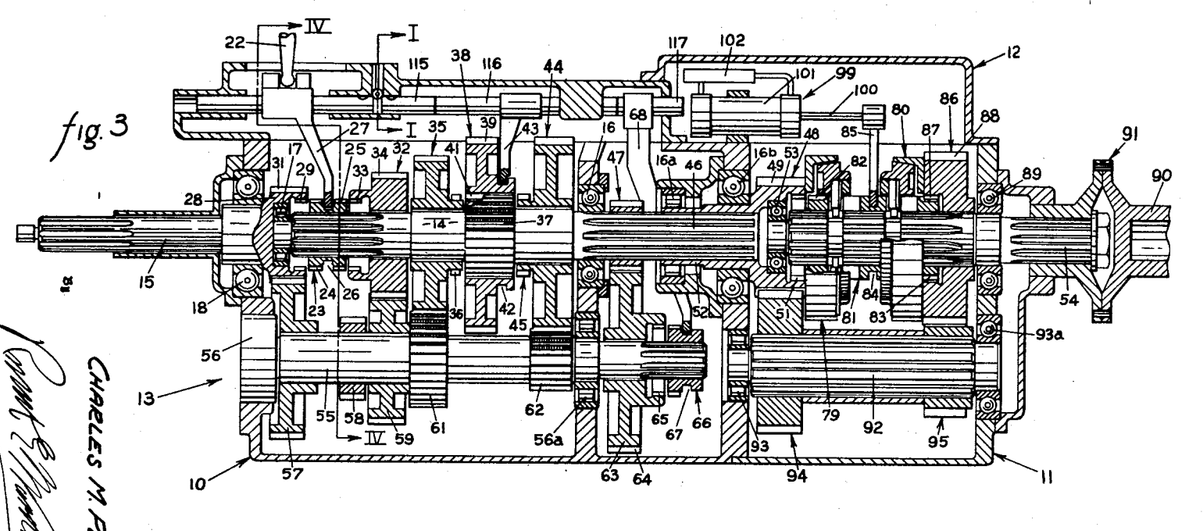
Figure 3 represents a transmission in central cross-section illustrating typical gear sets used with the apparatus of the invention.

For the purpose of convenience in description, the terms "leftwardly" and "rightwardly," as used in this specification, will be understood to mean leftwardly and rightwardly with respect to the transmission assembly when positioned as appearing in Figure 3. The terms "inwardly" and "outwardly" shall be understood to have reference to the geometric center of the transmission assembly or the sections 10, 11 and 12 thereof. The terms "upper" or "upwardly" and "lower" or "downwardly" shall be understood to refer to the entire assembly when positioned and/or operating in its normal manner of use. The term "one step" or "one-half step" when used with reference to the spacing of gear ratios, connotes the ratio spacing of the usual five-speed transmissions wherein the five speeds extend from low through high to overdrive and each ratio change constitutes one "step." In certain common transmissions now on the market, the adjacent gear sets have percentage steps from one to the next of from about 60% to about 90%, but this is illustrative only and not limiting.

With specific reference to the transmission 13, here selected for illustrative purposes, the main transmission box 10 is provided with a centrally disposed main shaft 14 and an input shaft 15, which shafts are preferably coaxial, with their adjacent ends closely spaced from each other within the main transmission section 10. The main shaft 14 is rotatably supported upon the main bearings 16, 16a and 16b within the main box 10 and the pilot bearing 17, said pilot bearing being mounted in and upon the adjacent end of the input shaft 15. The input shaft 15 is rotatably supported in one end of the main box 10 by means of the main bearing 18. The leftward end of the input shaft 15 is splined for conventional coupling usually through a clutch with said power means and is supported by a clutch pilot bearing (not shown).

The leftward end of the main shaft 14 is splined for axially movable support of the clutch member 23 having leftward and rightward sets of external teeth 24 and 25, respectively. The clutch member 23 is provided with a circumferential groove 26 between said teeth for engagement by a clutch fork 27, which fork is actuable by a shift lever 22 in a conventional manner.

The rightward end of the input shaft 15 is provided with an input gear 28 having internal and external teeth 29 and 31, respectively. The internal teeth 29 of the input gear 28 are engageable by the leftward teeth 24 of the clutch member 23 when said clutch member is in its leftward position upon the splined portion of the main shaft 14.

A small floating, third speed gear 32, which is rotatably supported upon the main shaft 14 adjacent to the clutch member 23, is provided with external teeth 34 and internal teeth 33 selectively engageable by the rightward teeth 25 of the said clutch member 23.

A medium floating, second speed gear 35 is rotatably supported upon the main shaft 14 adjacent to the rightward side of said low speed gear 32 and is provided with clutch teeth 36. A shaft gear 37 is positioned adjacent to said clutch teeth 36. A ring gear 38, having external teeth 39, is provided with internal teeth 41 whereby said ring gear is supported upon and engaged by the shaft gear 37 and is axially movable leftwardly and rightwardly with respect thereto. The ring gear 38 is provided with a circumferential groove 42 engageable by a clutch fork 43 which clutch fork is actuable by means of the shift lever 22 in a conventional manner.

A large floating, first speed gear 44, having clutching teeth 45, is rotatably supported upon the main shaft 14 adjacent to the rightward side of the shaft gear 37.

The rightward end 46 of the main shaft 14 is splined in a conventional manner and extends through the rightward end of the main box 10 into the auxiliary box 11. A second ring, overdrive gear 47 has an internally splined, centrally disposed opening for support upon and engagement with the splined rightward end of the main shaft 14, and is disposed adjacent to the rightward side of the main bearing 16.

A main output gear 48 having external teeth 49, internal teeth 51 and being within the auxiliary transmission box 11, is provided with a hub 52 which is internally splined for engagement with the rightward end 46 of the main shaft 14. The main bearings 16a and 16b encircle the hub 52 for support thereof. A pilot bearing 53 is mounted substantially within the rightward side of the output gear 48 for rotatable support of the leftward end of the auxiliary main shaft 54 hereinafter described.

A main countershaft 55 is rotatably supported within the main box 10, preferably directly below the main shaft 14 and parallel therewith, by the bearings 56 and 56a. A spur gear 57 is secured to the countershaft 55 adjacent to the bearing 56 for continuous engagement with the external teeth 31 of the input gear 28. A small spur gear 58 is secured to the countershaft 55 adjacent to the rightward side of said gear 57. A large spur gear 59 is secured to the countershaft 55 adjacent to the rightward side of the small spur gear 58 for continuous engagement with the external teeth 34 of the small floating, low speed, gear 32. A medium gear 61 is on the countershaft 55 in continuous engagement with the medium floating, second speed gear 35.

A small countershaft gear 62 is spaced rightwardly from the medium countershaft gear 61 and is continously engageable with the large floating, third speed gear 44.

A countershaft floating gear 63, having external teeth 64 and internal teeth 65, is rotatably supported upon the countershaft 55 adjacent to the rightward side of the bearing 56a.

The rightward end of the countershaft 55 is splined in a conventional manner. A clutch member 66, having a circumferential groove 67, is provided with an internally splined, centrally disposed opening for axially slidable support of the member upon the splined rightward end of the countershaft 55. The clutch member 66, which is adjacent to the floating gear 63, has external teeth engageable by the internal teeth 65 of the said floating gear 63. The circumferential groove 67 is engaged by a clutch fork 68 which is actuable by the shift lever 22 in a conventional manner. The external teeth 64 of the floating gear 63 are continuously engageable by and with the second ring, or overdrive, gear 47.

Figure 5:
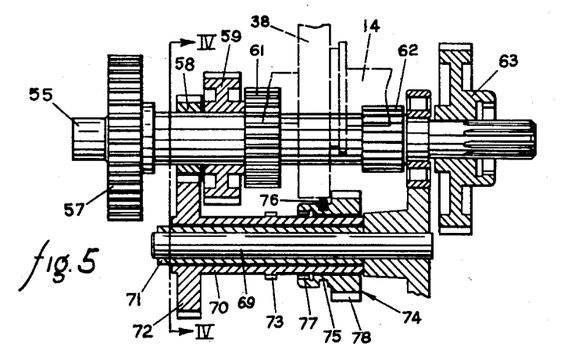
Figure 5 represents a section taken on the line V—V of Figure 4.

A reverse idler shaft 69, (Figure 5) is secured within the main transmission box 10, is disposed parallel with the countershaft 55, and is spaced substantially horizontally therefrom. Since it is provided with conventional gearing and operated in a conventional manner, detailed description thereof is considered unnecessary and is accordingly omitted.

*The auxiliary box*

While a wide variety of specific gear structures, including planetary, may be utilized in the auxiliary box, the hereinafter described construction has been found satisfactory and will be described in detail for illustrative purposes. However, whatever specific arrangement is utilized, it will usually provide two ratios of power transmission which ratios differ by an amount normally equal to the entire range of the main box, including overdrive, plus about one-half step. Alternatively, however, the auxiliary box ratios may differ by an amount equal to, or a little greater than, some other selected portion of the main box gears.

The auxiliary main shaft 54 is disposed within the auxiliary box 11 and is co-axial with the main shaft 14. Its leftward end is supported by the bearings 53 and a point near its rightward end is supported by the bearing 89. The extreme rightward end of the auxiliary shaft 54 is splined in a conventional manner for engagement with a propeller shaft 90 by means of any conventional, convenient, coupling 91. A clutch sleeve 81 is slidably supported upon the auxiliary shaft 54 adjacent to the main output gear 48 and is engaged for rotation therewith by suitable splining.

The clutch sleeve 81 is provided with leftward and rightward rings of external teeth 82 and 83, respectively, adjacent to the axial faces thereof, and a circumferential groove 84 is disposed intermediate the rings of teeth. The circumferential groove 84 is engaged by a clutch fork 85, secured to a semi-automatic shifting device, hereinafter described in detail, for reciprocable movement of the clutch sleeve 81 on the auxiliary shaft 54. The leftward teeth 82 of the clutch sleeve 81 are controllably engageable with the internal teeth 51 of the main output gear 48, such control being effected by the synchronizing clutch 79 when the clutch sleeve 81 is moved leftwardly along the auxiliary main shaft 54. An auxiliary output gear 86, which is rotatably supported upon the auxiliary main shaft 54 adjacent to the rightward side of clutch sleeve 81, is provided with internal teeth 87 and external teeth 88. The rightward ring of teeth 83 on the clutch sleeve 81 is controllably engageable with the internal teeth 87 of the output gear 86, said control being effected by the synchronizing clutch 80 when the clutch sleeve 81 is moved rightwardly along the auxiliary main shaft 54.

The synchronizing clutches 79 and 80, may be of any convenient and conventional type, such as the cone clutch disclosed and described in Patent No. 2,468,155. Hence, detailed description thereof is omitted here.

It will be understood that the capacity of these synchronizers for best results, will be sufficient to effect substantial synchronization during the time the shift lever is passing through neutral position at a relatively rapid rate, and preferably during the first half of such passage, having in mind that the entire shift will normally take about 0.6 second on an upshift and about 1.8 seconds on a downshift. Thus, substantial synchronization will preferably be completed in less than 0.5 second and to accomplish this the synchronizers must be of relatively large capacity. Nevertheless, successful operation will be secured if there is only a sufficient approximation of synchronization in the auxiliary box to permit prompt shifting of the main box and actual shifting of the auxiliary will in some instances actually be completed after the main box has been shifted.

An auxiliary countershaft 92 (Figure 3), which is preferably parallel with the auxiliary main shaft 54 and spaced downwardly therefrom, is rotatably supported at its extremities within the auxiliary box 11 by the bearings 93 and 93a. A large gear 94 is supported upon the auxiliary countershaft 92 near its leftward end for rotation therewith and continuous engagement with the external teeth 49 of the main output gear 48. A pinion gear 95 is supported upon the auxiliary countershaft 92 near its rightward end for rotation therewith and continuous engagement with the external teeth 88 of the auxiliary output gear 86.

Thus, in this embodiment, the auxiliary box 11 is provided with gears effecting a direct drive and one reduction ratio. The difference between the direct drive and reduction ratios of the auxiliary box in this embodiment of the invention is approximately one-half step greater than the entire speed range between first and fifth gear ratios provided in the main box 10.

The following table discloses in detail the gear ratios used in this embodiment and which have been found to operate satisfactorily in the main transmission box of a unit and auxiliary transmission assembly of an otherwise conventional truck:

| Gear Position | Gear Ratio | Percent Step Between Adjacent Sets |
|---|---|---|
| First | 2.10 | 28 |
| Second | 1.64 | 29.5 |
| Third | 1.27 | 27 |
| Fourth (direct) | 1.00 | 28 |
| Fifth (overdrive) | 0.779 | |

The reduction drive gear ratio in the auxiliary box, for use with the above ratios in the main box, was found to be satisfactory at 3.55. Thus, the ratios provided in the main box are substantially equal, approximately half-step ratios, as "half-step" is defined above. The ratio provided in the auxiliary box when in reduction position spans the entire main box ratios (2.69 in the example above) plus about one-half step (in this case 32 per cent).

| Transmission Position | Main Box Position | Auxiliary Box Position | Over-All Position |
|---|---|---|---|
| 1 | First | Reduction | 7.45 |
| 2 | Second | ----do---- | 5.82 |
| 3 | Third | ----do---- | 4.49 |
| 4 | Fourth (direct) | ----do---- | 3.55 |
| 5 | Fifth (overdrive) | ----do---- | 2.76 |
| 6 | First | Direct | 2.10 |
| 7 | Second | ----do---- | 1.64 |
| 8 | Third | ----do---- | 1.27 |
| 9 | Fourth | ----do---- | 1.00 |
| 10 | Fifth (overdrive) | ----do---- | 0.779 |

It will be understood that the above description of the main transmission box 10 and the auxiliary transmission box 11 is given in detail for illustrative purposes only, and it is not intended that the specific details thereof impose any limitation upon the scope of the invention.

*Auxiliary box actuating means*

The means for actuating the auxiliary box 11 may be of any of a wide variety of power devices to move the clutch sleeve 81 of the auxiliary box, when, and only when, the operator moves a suitable preselecting device and the main box thereafter comes into neutral position. The operating parts may be placed anywhere which is convenient and consistent with their effective operation. The specific device hereinafter described will illustrate one effective embodiment.

As shown in Figure 3, the auxiliary box actuating section 12 is preferably mounted on, or adjacent to, the auxiliary transmission box 11 for semiautomatic actuation of the auxiliary clutch sleeve 81. The actuating section 12 contains an automatic shift control mechanism 99 (Figures 1 and 3) comprising a double acting actuating cylinder 101, an actuation arm 100, and a two-way selector valve 102 of any conventional type, which is connected in a conventional manner by means of pipes 103 and 104 to said cylinder 101. Although the cylinder 101 is hereinafter described and disclosed as an air cylinder, which may be either pressure or vacuum, it will be understood that said cylinder may also be actuated hydraulically. A pressure system is hereinafter assumed for illustrative purposes.

The selector valve 102 (Figure 1) is in turn connected to a pressure source 108 by means of the pipe 109. Said pressure source may be of any convenient nature, such as the compressed air system provided for the vehicle's brakes.

Figure 1:
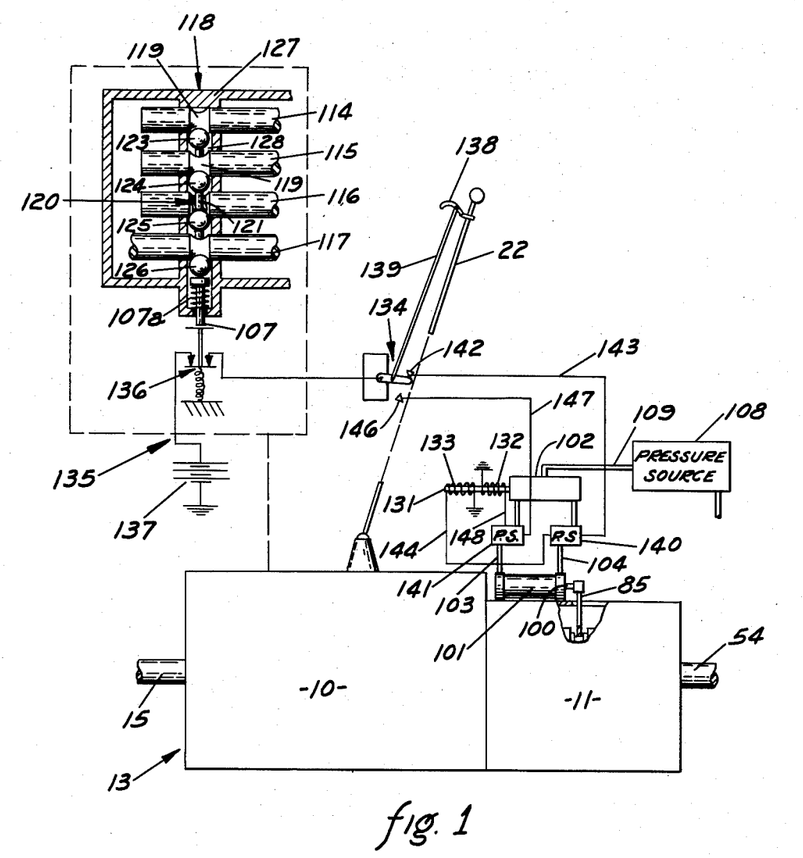
Figure 1 represents a schematic diagram of the apparatus of the invention including a section taken on the line I—I of Figure 3.

The selector valve 102 is actuated by the plunger 131 of the solenoid, said solenoid having independent windings 132 and 133. Said valve 102 is of the conventional type wherein the parts thereof are so proportioned that when said valve is fully moved into either position, continued pressure on the inlet side thereof will tend to hold said valve structure in whichever position it then occupies. Thus, regardless of which way the valve is shifted, continued pressure from the pressure source 108 will tend to hold the valve in that shifted position.

Said plunger 131 is operatively associated with the solenoid windings 132 and 133 in such a manner that the energization of the winding 132 will move said plunger 131 rightwardly, as appearing in the drawing, and energization of the winding 133 will move said plunger 131 leftwardly, whereby corresponding movement of the mechanism of said valve 102 is brought about. Said solenoid is of any conventional type and, in the particular circuit here utilized to illustrate the invention, each winding thereof is connected through a manually controlled, conventional selector switch 134 to a series circuit 135 which includes, in addition to the selector switch 134, the normally closed control switch 136 and a source 137 of constant potential. The selector switch 134 is manually actuated by any conventional means under the direct control of the operator, such as a selector lever 138 mechanically connected to said switch 134 by a rod 139, and which operates to determine which of said solenoid windings is at a given moment connected to the source 137.

A pressure switch 140 is introduced into the conduit 104 and another pressure switch 141 is introduced into the conduit 103. The contact 142 of the selector switch 134 is connected by a conductor 143 to one side of the pressure switch 140 and the other side of the pressure switch is connected by a conductor 144 to the solenoid winding 133. The contact 146 of the selector switch 134 is connected by a conductor 147 to one side of the pressure switch 141 and the other side of said pressure switch is connected by a conductor 148 to the solenoid 132. Said pressure switches are preferably of the normally open type, that is, electrical contact is made between the terminals thereof only upon the obtaining of a predetermined pressure, or vacuum in the case of vacuum switches, within the conduit with which they are associated.

Figures 4, 6:
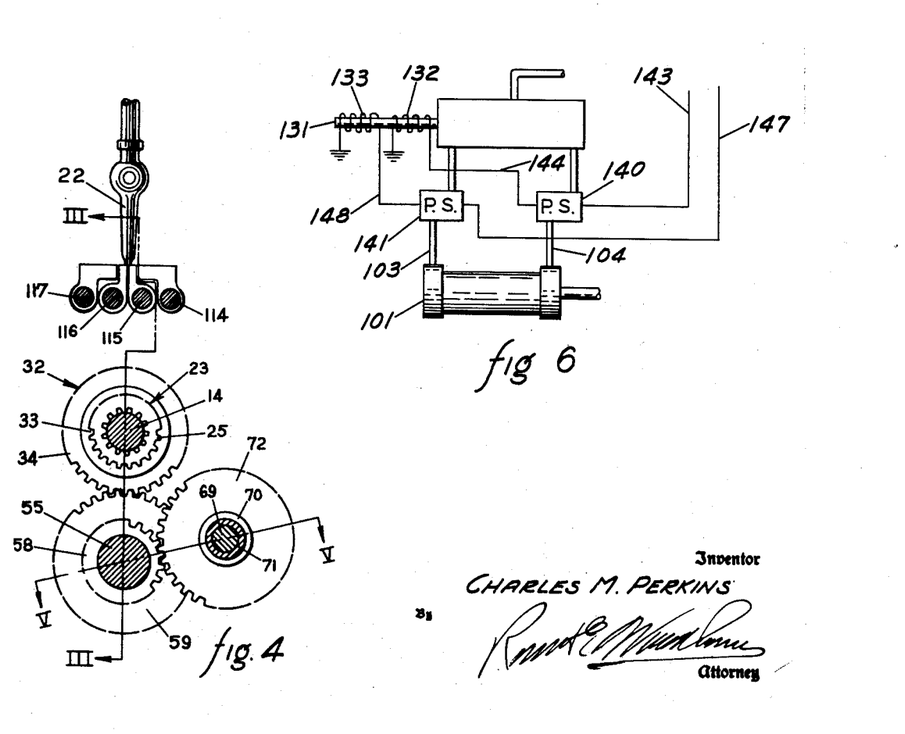
Figure 4 represents a section taken on the line IV—IV of Figures 3 and 5.
Figure 6 represents a modification of the invention.

Alternatively, it is possible to use normally closed pressure switches and a circuit utilizing such switches is shown in Figure 6. In Figure 6 the conductor 143 is connected to the pressure switch 140 as before but the conductor 144 is now connected to the solenoid 132. The conductor 147 is connected to the pressure switch 141 as before but the conductor 148 is now connected to the solenoid 133. The differences in operation will appear below.

The shift rods 114, 115, 116 and 117 and the interlock means 118 associated therewith may be of any conventional form, such as those illustrated in said application Serial No. 133,404, or as further illustrated in detail in the United States patent to Padgett No. 1,943,694. Said shift rods are conventionally and reciprocably supported in means, such as the guide block 127, located within the housing of the main box 10, as shown in Figures 1 and 3. Each shift rod has an annular groove 119 (Figure 1), which grooves are aligned with respect to each other in a direction perpendicular to the axes of said shift rods when said main gear group is in neutral position. The openings 120 which extend through the shift rods 115, 116 and 117, communicate with diametrically opposite portions of the grooves 119. Pins 121 are slidably disposed within each opening 120 and balls 123, 124, 125 and 126 are disposed between the shift rods and engageable by the pins 121. Each ball is substantially equal in diameter to the distance between the shift rods on either side thereof plus the depth of the groove 119 in one of said rods. The pins 121 are equal in length to the diameter of the respective shift rods with which each is associated less the depth of the groove therein. A cylindrical retaining passageway 128 is provided in the guide block 127 transversely of the shift rods for preventing movement of the balls out of their alignment with each other when one of the shift rods, together with the pin 121 therein, is moved during a shift of the main box. There are as many balls as shift rods, with one ball 126 disposed laterally outwardly of and adjacent to the shift rod 117.

The several balls and pins 121 cooperate with the grooves 119 to provide an interlock mechanism which prevents more than one shift rod from leaving neutral position at any one time.

When one of the shift rods, here for illustration the rod 116, is shifted out of neutral position (Figure 1), the balls, the pins and the rod 116 cooperate to urge the actuating pin 107 sidewardly (downwardly as appearing in Figure 1) against the compression of the spring 107a to open the control switch 136.

When the shift rods are all in neutral (Figure 1), the spring 107a moves the actuating pin 107 upwardly away from the control switch 136, whereby said switch is closed, thereby energizing the circuit 135 and whichever solenoid winding is connected therewith.

Operation

Inasmuch as the particular main gear group and auxiliary gear group above described are conventional, their operation will be understood without description. However, reference may, if desired, be made to said application Serial No. 133,404 for a detailed description of the operation of this particular main and auxiliary gear assembly.

The interengagement of the various corresponding gears within the transmission assembly 13, for the purpose of effecting the various above mentioned gear ratios, may be accomplished in a conventional manner by means of the shift lever 22 and the shift rods 114, 115, 116 and 117.

The clutch sleeve 81 in the auxiliary box 11 is moved axially along the auxiliary main shaft 54 (Figure 3) by means of the actuating arm 100 of the air cylinder 101 acting through the clutch fork 85. When the clutch sleeve 81 is in the leftward position (Figure 3) it engages the output gear 48, thereby effecting a direct drive through the auxiliary box 11. When the clutch sleeve 81 is in the rightward position (Figures 1 and 3) it engages the auxiliary output gear 86, thereby effecting a reduction drive through the auxiliary box 11. The synchronizing clutches 79 and 80 provide means for reducing the speed of the main shaft 14 prior to engagement between the clutch sleeve 81 and the main output gear 48, in a known manner, and for speeding up the main shaft 14 and auxiliary countershaft 92 prior to engagement between the clutch sleeve 81 and the auxiliary output gear 86, also in a known manner.

Turning now to the operation of the shift control means, it should be borne in mind that the shift of the auxiliary gear group must be made very quickly in order to be completed before the speed of the power means driving the entire transmission assembly 13 has retarded beyond the point at which engagement of the gears in the new shift position may be made. Since this normally requires less than a second, the need for a rapid shift is apparent.

Thus, the shift fork 85, when positioned as appearing in Figure 3 effects a reduction drive through the gears in the auxiliary box 11, and, when positioned as appearing in Figure 1, effects a direct drive through said auxiliary box. It will be assumed for descriptive purposes that movement of the plunger 131 leftwardly will direct pressure fluid into the leftward end of the cylinder 101 and movement of said plunger 131 rightwardly will direct pressure fluid into the rightward end of said cylinder 101.

It will also be assumed that flow of pressure fluid into the leftward end of the cylinder 101 will move the shift fork 85 into its rightward, or gear reduction, position and flow of pressure fluid into the rightward end of cylinder 101 will move said shift fork 85 into its leftward, or direct drive, position. These assumptions are all consistent with a preferred embodiment of the apparatus but are here designated for illustrative purposes only. It will be evident that they may be altered without destroying the purposes or scope of the invention.

Therefore, in starting a vehicle equipped with the improved transmission of this invention, as appearing in Figure 1, in its lowest gear, the selector lever 138 will be in its upward position, the valve 102 will be in its leftward position so that pressure fluid will be introduced through conduit 103 into the leftward end of the cylinder 101 and the shift fork 85 will be in its rightward position. The pressure switch 141 will be closed and the pressure switch 140 will be open.

As the vehicle gathers speed and the gears in the main gear group are shifted from the lowest ratio to the highest ratio in a known manner by the operation of the shift lever 22, the control switch 136 is closed each time the main gear group, and consequently the interlock mechanism, comes into its neutral position. This connects the source 137 to the conductor 143 closes the circuit 135 but since the switch 140 is open the solenoid 133 is not energized. Thus, the pressure fluid continues constantly to be directed to the leftward end of the cylinder 101 and the shift fork 85 continues to be held in its rightward, or reduction, position.

However, if upon reaching the end of the available ratios in the main gear group the operator desires to shift the auxiliary gear group into its direct drive position and to return the main gear group to its lowest ratio in order to continue the progression of the entire transmission unit through additional ratios, the selector lever 138 is moved into its downward position while the main gear group is still in a shifted position.

When the main transmission now moves into its neutral position, and the balls fall into the several rod grooves (Figure 1) the control switch 136 closes and the conductor 147 is connected to the source 137. The pressure switch 141 is also closed. Hence, the closing of the control switch 136 now energizes the said solenoid winding 132 through the closed switch 141 and causes the plunger 131 to move rightwardly. In this position the valve 102 terminates the flow of pressure fluid into the line 103, directs pressure fluid into the rightward end of the cylinder 101 and the shift fork 85 is moved into its leftward position (Figure 1).

The relieving of the pressure in the line 103 permits the pressure switch 141 to open and thereby breaks the circuit through the solenoid 132 and de-energizes same. Since the relieving of pressure in the line 103 does not occur until after the valve 102 is fully shifted, the solenoid will remain energized until its function is completed. Thereafter, the fluid pressure in conduit 104 will hold the valve in shifted position.

The first reaction to movement of the clutch sleeve 81 leftwardly is a synchronization of its rotational speed with the speed of the main output gear 48 by means of the synchronizing clutch 79. When this synchronization has been accomplished, the clutch sleeve 81, under the continuing urging of the pressure fluid, shifts the auxiliary box from reduction to direct drive. The main box 10 can be shifted by means of the shift lever 22 into its low gear position as soon as said synchronism is effected, whether or not the clutch sleeve 81 has actually completed its shift. Accordingly, the shift lever 22 is simultaneously moved from its high position to its low position and the shift from direct drive in the main box and reduction drive in the auxiliary box to low ratio in the main box and direct drive in the auxiliary box is completed. The shift progression may then be continued in the main box as desired.

Down-shifting of the transmission is carried out in the same manner as described above for up-shifting excepting only that the motions are in the reverse direction. In such case, the selector switch 134 is moved to its opposite position against contact 142 and the inter-lock switch 136 is closed upon the attainment of neutral position of the main gear set, the electrical energy is conducted through the conductor 143 through the closed switch 140 to the solenoid winding 133. This causes movement of the valve leftwardly and admission of pressure fluid to the conduit 103. As soon as pressure is established in said conduit 103, the pressure switch 141 closes and, as soon as pressure within the conduit 104 falls in response to the movement of the valve, the pressure switch 140 opens. Thus, the solenoid winding 133 is de-energized and the circuit including the switch 141 and the solenoid 132 is made ready for the next shifting operation.

It will be observed that when the auxiliary gear group has once shifted as a result of a movement of the selector lever 138 followed by entry of the main gear group into neutral, the main gear group may thereafter enter and leave neutral as often as desired without effecting any further shift of the auxiliary gear group. Likewise, it will be observed that so long as the main gear group does not enter into its neutral position, the selector lever 138 may be moved upwardly or downwardly as often as desired without effecting any change in the auxiliary gear group. Shifting of the auxiliary gear group is, therefore, effected only by a movement of the lever 138 from one position into its other position followed by movement of the main gear group into neutral position.

*Alternative structures*

Figure 7:
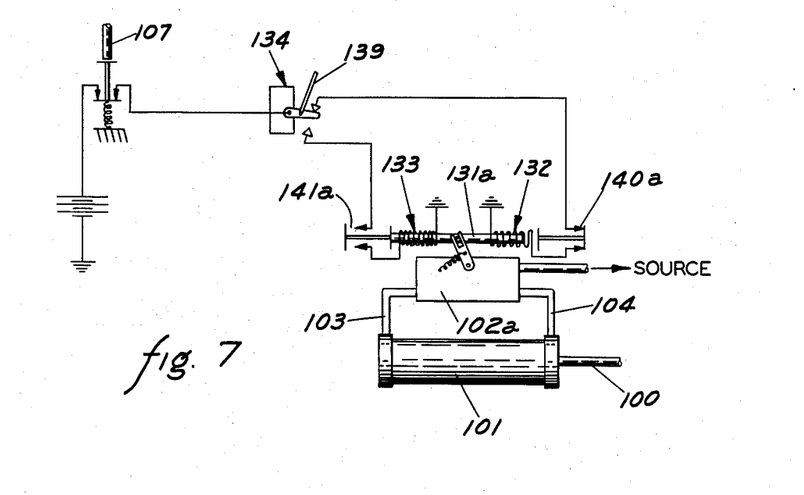
Figure 7 represents a further modification of the invention.

Figure 7 shows a modification in which the pressure switches 140 and 141 are replaced in the electrical circuit by normally closed mechanical switches 140a and 141a (Fig. 7). These switches are operated mechanically by the solenoid armature 131a, as shown, or by means moving in response to said solenoid armature, as the actuation arm 109. Thus, completion of movement of the armature 131a leftwardly in response to energization of the solenoid winding 133 will open the switch 141a and thereby de-energize the solenoid winding 133, and completion of movement of the armature 131a rightwardly in response to energization of the solenoid winding 132 will open the switch 140a and de-energize the winding 132. The remainder of the operations will occur the same as above described in detail for the form shown in Figure 1.

Figures 2, 8:
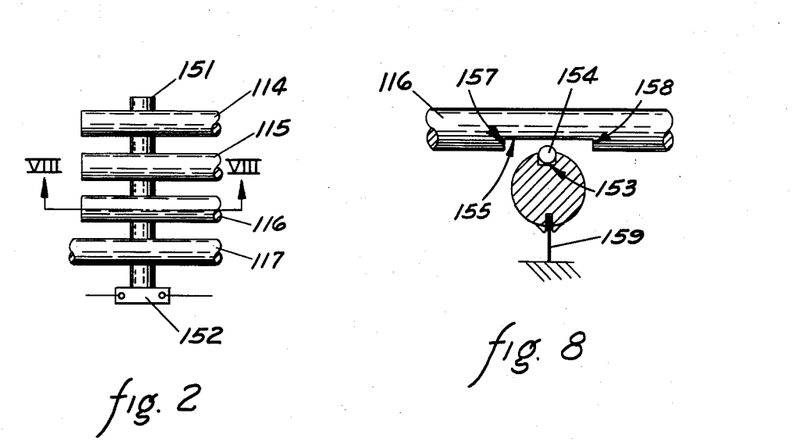
Figure 2 represents a modification of the interlock switch structure.
Figure 8 represents a section taken on line VIII—VIII of Figure 2.

Figures 2 and 8 show a rotary switch connection which may replace the micro-switch indicated in Figure 1. The shaft 151 of the switch 152 extends under all of the shift rods 114, 115, 116 and 117. A rectangular groove 153 is cut along the upper side of the shaft 151 under each shift rod and a roller 154 is placed in each of such grooves. A cut-out 155 is provided on the underside of each shift rod for bracketing each of said rollers when the gear set is in its neutral position and the edges 157 and 158 of each shift rod cut-out will engage each of said rollers respectively when said shift rods move out of neutral position. Such engagement will effect rotation of the shaft 151 and opening of the switch. A spring 159 is preferably provided to hold the switch centered in closed position when the shift rods are in neutral.

Inasmuch as the solenoid winding is energized for only a brief period of time, usually a few seconds at the most, it is possible to use a substantially smaller winding than would otherwise be required. In this case, for example what is normally termed a one-volt winding may be successfully used in a six volt circuit with the result of saving both cost and space and the securing of faster action.

When the vehicle, with which the above described control mechanism is used, is not in operation, the circuit 135 may be broken by the ignition key of said vehicle or by other conventional means arranged in a conventional manner.

Although the above mentioned drawings and description apply to certain particular preferred embodiments of my invention, it is not my intention, implied or otherwise, to eliminate other variations or modifications which do not depart from the scope of the invention unless specifically stated to the contrary in the hereinafter appended claims.

I claim:

1. In fluid pressure energized, electrically controlled gear shift mechanism including a pressure fluid controlling directional valve and a solenoid having a pair of windings and an armature for operating said valve, said mechanism effecting a shifting of a second gear set upon the attainment of a predetermined position by a first gear set, one of said windings being energized upon attainment by said first gear set of said predetermined position, means for deenergizing said one solenoid winding after its function has been performed, comprising in combination: a pair of normally open electric switches in series with each of said solenoid windings, respectively, said switches being so related to the shift controlling mechanism that at any given time when a shift rod is out of its neutral position the switch connected with the last solenoid winding to have been energized is open and the switch connected with the other solenoid winding is closed; means responding to energization of said other winding of said solenoid but only after its function in the shifting operation has been performed for opening the last named switch and closing the next preceding named switch.

2. In fluid pressure energized, electrically controlled gear shift mechanism including a pressure fluid controlling directional valve and a solenoid having a pair of windings and an armature for operating said valve, conduits connecting said valve to an actuating cylinder for power shifting of said mechanism, said mechanism effecting a shifting of a second gear set upon the attainment of a predetermined position by a first gear set, one of said windings being energized upon attainment by said first gear set of said predetermined position, means for deenergizing said one solenoid winding after its function has been performed, comprising: a pair of pressure responsive electric switches arranged, respectively, in association with said conduits for opening and closing in response to pressure therein; conductors connecting each of said switches in series respectively with one of said windings, said connecting being such that at any given time when a shift rod is out of its neutral position the switch connected with the last solenoid winding to have been energized is open and the switch connected with the other solenoid winding is closed.

3. In fluid pressure energized, electrically controlled gear shift mechanism including a pressure fluid controlling directional valve and a solenoid having a pair of windings and an armature for operating said valve, conduits connecting said valve to an actuating cylinder for power shifting of said mechanism, said mechanism effecting a shifting of a second gear set upon the attainment of a predetermined position by a first gear set, one of said windings being energized upon attainment by said first gear set of said predetermined position, means for deenergizing said one solenoid winding after its function has been performed comprising: a pair of pressure responsive, normally open electric switches arranged respectively in association with said conduits for closing upon the occurrence of pressure therein; conductors connecting each of said switches in series, respectively, with each of said windings, said connecting being such that at any given time when a shift rod is out of its neutral position the switch connected with the last solenoid winding to have been energized is open and the switch connected with the other solenoid winding is closed.

4. In a multiple speed transmission, the combination comprising: a first gear group; a second gear group having friction clutch synchronizing means and means serially connecting said second group with said first group, said second gear group having a ratio not materially less than the ratio in the first gear group between its low position and its direct drive position; shifting means automatically energizable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization; energizing means comprising an electric circuit for effecting energization of said power means; limit means actuated by said shifting means de-energizing said electric circuit upon completion of the function of said electric circuit in a given shifting sequence independently of the position of the first gear set; control means operable to open said circuit; and actuating means associated with, and operable by, said first gear group for operating said control means, and thereby opening said circuit, when said first gear group is in a shifted position, and closing said circuit immediately upon the entry of said first gear group into neutral position.

5. In a multiple speed transmission having a first gear group and a second gear group in series therewith said second gear group having a ratio not materially less than the ratio in the first gear group between its low position and its direct drive position, the combination comprising: a plurality of shift rods for effecting a shift of the first gear group; friction clutch synchronizing means associated with said second gear group; a source of fluid under pressure; fluid actuated means connecting to said source and shift means operable thereby for automatically initiating said synchronizing means and shifting said second gear group; a source of electric energy and a control switch; means responsive to the position of said first gear group for opening said control switch when said first gear group is in gear; a manually controllable selector switch and means connecting said source of electric energy, said control switch and said selector switch in series circuit; and an electrically responsive two-position valve having a pair of solenoid windings, said windings being alternatively connected through said selector switch to said series circuit for controlling the actuation of said fluid actuated means; means responsive to the position of said first gear group for closing said control switch when said first gear group is in neutral, whereby said valve is moved from one position to the other or held in a selected position depending upon the position of said selector switch each time said first gear group enters neutral position; means responsive to the position of said valve de-energizing the last energized solenoid winding substantially upon completion of movement of said valve.

6. In a transmission assembly having a first gear group and a second gear group, said second gear group having a ratio not materially less than the ratio of a selected portion of the first gear group, and a plurality of shift rods for said first gear group and an interlock mechanism associated therewith, a shift control for the second gear group comprising in combination: a source of fluid under pressure and a fluid driven actuator connected thereto; shift means connected to said actuator for shifting said second gear group; a two-position valve controlling the direction of flow of fluid to said actuator; electrically responsive means controlling the position of said valve and a source of electric power for energizing same; a manually controllable selector switch controlling the flow of energy from said power source to said electrically responsive means for urging said valve into one position or the other position, and a normally closed control switch in series with said power source and said selector switch; actuating means associated with said interlock mechanism for holding said control switch open whenever said first gear group is out of neutral position; and limit means actuated upon shifting of said valve for de-energizing said electrically responsive means.

7. A device for shifting a second gear group having a shift fork and being in series association with a first gear group, said second gear group having a ratio not materially less than the ratio in the first gear group between its low position and its direct drive position; said first gear group having a plurality of parallel, spaced shift rods and an interlock mechanism comprising a circumferential groove on each of the shift rods, a ball positioned between each of said shift rods and disposable within said grooves, and co-axial pins slidably extending through said shift rods in communication with said grooves, said grooves, balls and pins being on a common axis perpendicular to the axes of said shift rods when said first gear group is in neutral position, the combination comprising: a fluid responsive actuating cylinder and means operatively connecting the piston thereof to said shift fork; a source of fluid under pressure and conduits connecting same to each end of said cylinder; a two-position valve interposed in said conduits; a two-winding solenoid having an axially reciprocable plunger connected to said valve for moving same in response to the movement of said plunger; a source of electric power, a micro-switch and a selector switch and means connecting said three last-named elements and the solenoid windings in a branched series circuit wherein said windings are in parallel with each other and the position of said selector switch determines which of said windings is connected with the other elements of said circuit; manually actuable means for operating said selector switch; an actuating pin co-axial with the assembly of said balls and pins and means supporting said actuating pin for axial movement thereof; a further ball snugly disposed between said actuating pin and the adjacent shift rod and engageable by the pin therein; resilient means urging said actuating pin toward said shift rods; means supporting said micro-switch and for actuating and opening said micro-switch when said first gear group is in neutral; and a pair of pressure responsive switches associated, respectively, with each of said conduits and connected respectively in series with each winding of said solenoid for de-energizing said windings immediately after their respective functions have been completed in a shifting sequence.

8. In a multiple speed transmission, the combination comprising: a first gear group having shift rods and a second gear group having friction clutch synchronizing means and means serially connecting said second group with said first group, said second gear group having a ratio not materially less than the ratio in the first gear group between its low position and its direct drive position; shifting means automatically actuable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization; energizing means comprising an electric circuit for effecting energization of said power means; control means operable to open said circuit; and actuating means associated with, and operable by, said shift rods for operating said control means, and thereby opening said circuit in a shifted position and causing said circuit to close immediately upon the entry of said first gear group into neutral position; limit means opening said electric circuit independently of said control means upon completion of the function thereof in a shifting sequence.

References Cited in the file of this patent

UNITED STATES PATENTS

| | | |
|---|---|---|
| 2,115,089 | Tenney | Apr. 26, 1938 |
| 2,115,390 | Lasley et al. | Apr. 26, 1938 |
| 2,365,732 | Snow | Dec. 26, 1944 |
| 2,445,716 | Sternberg | July 20, 1948 |
| 2,640,374 | Willis | June 2, 1953 |